(12) United States Patent
Mammou et al.

(10) Patent No.: US 11,538,196 B2
(45) Date of Patent: Dec. 27, 2022

(54) PREDICTIVE CODING FOR POINT CLOUD COMPRESSION

(71) Applicant: Apple Inc., Cupertino, CA (US)

(72) Inventors: Khaled Mammou, Vancouver (CA); David Flynn, Munich (DE); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/061,450

(22) Filed: Oct. 1, 2020

(65) Prior Publication Data

US 2021/0104075 A1 Apr. 8, 2021

Related U.S. Application Data

(60) Provisional application No. 62/909,693, filed on Oct. 2, 2019.

(51) Int. Cl.
*G06T 9/40* (2006.01)
*G06T 9/00* (2006.01)

(52) U.S. Cl.
CPC .............. *G06T 9/001* (2013.01); *G06T 9/40* (2013.01)

(58) Field of Classification Search
None
See application file for complete search history.

(56) References Cited

U.S. PATENT DOCUMENTS

| | | | |
|---|---|---|---|
| 5,793,371 A | 8/1998 | Deering | |
| 5,842,004 A | 11/1998 | Deering | |
| 5,867,167 A | 2/1999 | Deering | |
| 5,870,094 A | 2/1999 | Deering | |
| 5,905,502 A | 5/1999 | Deering | |
| 5,933,153 A | 8/1999 | Deering | |
| 6,018,353 A | 1/2000 | Deering | |
| 6,028,610 A | 2/2000 | Deering | |
| 6,088,034 A | 7/2000 | Deering | |
| 6,188,796 B1 | 2/2001 | Kadono | |
| 6,215,500 B1 | 4/2001 | Deering | |

(Continued)

FOREIGN PATENT DOCUMENTS

| | | |
|---|---|---|
| CA | 309618 | 10/2019 |
| CN | 10230618 | 1/2012 |

(Continued)

OTHER PUBLICATIONS

W. Zhu, Y. Xu, L. Li and Z. Li, "Lossless point cloud geometry compression via binary tree partition and intra prediction," 2017 IEEE 19th International Workshop on Multimedia Signal Processing (MMSP), 2017, pp. 1-6, doi: 10.1109/MMSP.2017.8122226. (Year: 2017).*

(Continued)

*Primary Examiner* — James A Thompson
(74) *Attorney, Agent, or Firm* — Alexander A. Knapp; Kowert, Hood, Rankin & Goetzel, P.C.

(57) ABSTRACT

An encoder is configured to compress point cloud geometry information using a prediction tree. Ancestor nodes of a node added to the prediction tree may be used to determine the predicted value of the node to be added according to a prediction technique. The prediction tree may be encoded and may be provided for transmission to a decoder that can regenerate the point cloud.

20 Claims, 11 Drawing Sheets

(56) References Cited

U.S. PATENT DOCUMENTS

| | | |
|---|---|---|
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 3,040,355 A1 | 10/2011 | Burley |
| 3,055,070 A1 | 11/2011 | Bassi et al. |
| 8,411,932 B2 | 4/2013 | Liu et al. |
| 8,520,740 B2 | 8/2013 | Flachs |
| 8,643,515 B2 | 2/2014 | Cideciyan |
| 8,780,112 B2 | 7/2014 | Kontkanen et al. |
| 8,805,097 B2 | 8/2014 | Ahn et al. |
| 8,884,953 B2 | 11/2014 | Chen et al. |
| 9,064,311 B2 | 6/2015 | Mammou et al. |
| 9,064,331 B2 | 6/2015 | Yamashita |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | Karlinsky et al. |
| 10,546,415 B2 | 1/2020 | Petkov |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou et al. |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 * | 3/2021 | Li ......................... H04N 19/96 |
| 10,939,129 B2 | 3/2021 | Mammou |
| 10,977,773 B2 | 4/2021 | Hemmer |
| 10,984,541 B2 | 4/2021 | Lim |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2 | 5/2021 | Oh |
| 11,044,478 B2 | 6/2021 | Tourapis et al. |
| 11,044,495 B1 | 6/2021 | Dupont |
| 11,095,908 B2 | 8/2021 | Dawar |
| 11,113,845 B2 | 9/2021 | Tourapis et al. |
| 11,122,102 B2 | 9/2021 | Oh |
| 11,122,279 B2 | 9/2021 | Joshi |
| 11,132,818 B2 | 9/2021 | Mammou et al. |
| 11,200,701 B2 | 12/2021 | Aksu |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2 | 2/2022 | Roimela |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2 | 5/2022 | Melkote |
| 11,363,309 B2 | 6/2022 | Tourapis et al. |
| 11,386,524 B2 | 7/2022 | Mammou et al. |
| 11,398,058 B2 | 7/2022 | Zakharchenko |
| 2002/0181741 A1 | 12/2002 | Masukura |
| 2004/0217956 A1 | 11/2004 | Besl et al. |
| 2006/0133508 A1 | 6/2006 | Sekiguchi |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2009/0016598 A1 | 1/2009 | Lojewski |
| 2009/0087111 A1 | 4/2009 | Noda et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman |
| 2010/0208807 A1 | 8/2010 | Sikora |
| 2010/0260429 A1 | 10/2010 | Ichinose |
| 2010/0260729 A1 | 10/2010 | Cavato et al. |
| 2010/0296579 A1 | 11/2010 | Panchai et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |
| 2013/0195352 A1 | 8/2013 | Nystad |
| 2013/0202197 A1 | 8/2013 | Reeler |
| 2013/0321418 A1 | 12/2013 | Kirk |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |

(56) References Cited

U.S. PATENT DOCUMENTS

| | | |
|---|---|---|
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Boch |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0249401 A1 | 8/2017 | Eckart et al. |
| 2017/0337724 A1 | 11/2017 | Gervais |
| 2017/0347100 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0192061 A1 | 7/2018 | He |
| 2018/0268570 A1 | 9/2018 | Budagavi |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1* | 11/2019 | Pavlovic .................. G06T 9/001 |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0151913 A1 | 5/2020 | Budagavi |
| 2020/0153885 A1 | 5/2020 | Lee et al. |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi |
| 2020/0219288 A1 | 7/2020 | Joshi |
| 2020/0219290 A1 | 7/2020 | Tourapis et al. |
| 2020/0228836 A1 | 7/2020 | Schwarz et al. |
| 2020/0244993 A1 | 7/2020 | Schwarz et al. |
| 2020/0260063 A1 | 8/2020 | Hannuksela |
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0302571 A1 | 9/2020 | Schwartz |
| 2020/0302578 A1 | 9/2020 | Graziosi |
| 2020/0302621 A1* | 9/2020 | Kong ...................... G06T 7/215 |
| 2020/0302651 A1* | 9/2020 | Flynn .................... G06T 3/4084 |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2021/0005006 A1 | 1/2021 | Oh |
| 2021/0006805 A1 | 1/2021 | Urban et al. |
| 2021/0006833 A1 | 1/2021 | Tourapis |
| 2021/0012536 A1 | 1/2021 | Mammou et al. |
| 2021/0012538 A1* | 1/2021 | Wang ........................ G06T 9/40 |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0084333 A1 | 3/2021 | Zhang |
| 2021/0090301 A1 | 3/2021 | Mammou et al. |
| 2021/0097723 A1 | 4/2021 | Kim et al. |
| 2021/0097725 A1 | 4/2021 | Mammou et al. |
| 2021/0097726 A1 | 4/2021 | Mammou et al. |
| 2021/0099701 A1 | 4/2021 | Tourapis |
| 2021/0103780 A1 | 4/2021 | Mammou et al. |
| 2021/0104014 A1 | 4/2021 | Kolb |
| 2021/0104073 A1 | 4/2021 | Yea et al. |
| 2021/0105022 A1 | 4/2021 | Flynn et al. |
| 2021/0105493 A1 | 4/2021 | Mammou et al. |
| 2021/0105504 A1 | 4/2021 | Hur et al. |
| 2021/0112281 A1 | 4/2021 | Wang |
| 2021/0118190 A1 | 4/2021 | Mammou et al. |
| 2021/0119640 A1 | 4/2021 | Mammou et al. |
| 2021/0142522 A1 | 5/2021 | Li |
| 2021/0150765 A1 | 5/2021 | Mammou |
| 2021/0150766 A1 | 5/2021 | Mammou et al. |
| 2021/0166432 A1 | 6/2021 | Wang |
| 2021/0166436 A1 | 6/2021 | Zhang |
| 2021/0168386 A1 | 6/2021 | Zhang |
| 2021/0183112 A1 | 6/2021 | Mammou et al. |
| 2021/0185331 A1 | 6/2021 | Mammou et al. |
| 2021/0195162 A1 | 6/2021 | Chupeau et al. |
| 2021/0203989 A1 | 7/2021 | Wang |
| 2021/0211724 A1 | 7/2021 | Kim et al. |
| 2021/0217139 A1 | 7/2021 | Yano |
| 2021/0217203 A1 | 7/2021 | Kim et al. |
| 2021/0217206 A1 | 7/2021 | Flynn |
| 2021/0218969 A1* | 7/2021 | Lasserre ................. G06T 9/005 |
| 2021/0218994 A1 | 7/2021 | Flynn |
| 2021/0233281 A1 | 7/2021 | Wang et al. |

(56) References Cited

U.S. PATENT DOCUMENTS

| | | | |
|---|---|---|---|
| 2021/0248784 A1* | 8/2021 | Gao | G06T 9/001 |
| 2021/0248785 A1* | 8/2021 | Zhang | H04N 19/17 |
| 2021/0256735 A1 | 8/2021 | Tourapis et al. | |
| 2021/0258610 A1 | 8/2021 | Iguchi | |
| 2021/0264640 A1 | 8/2021 | Mammou et al. | |
| 2021/0264641 A1 | 8/2021 | Iguchi | |
| 2021/0266597 A1 | 8/2021 | Kim et al. | |
| 2021/0295569 A1 | 9/2021 | Sugio | |
| 2021/0319593 A1 | 10/2021 | Flynn | |
| 2021/0337121 A1 | 10/2021 | Johnson et al. | |
| 2021/0383576 A1 | 12/2021 | Olivier | |
| 2021/0400280 A1* | 12/2021 | Zaghetto | H04N 19/597 |
| 2021/0407147 A1 | 12/2021 | Flynn | |
| 2021/0407148 A1 | 12/2021 | Flynn | |
| 2022/0030258 A1 | 1/2022 | Zhang | |
| 2022/0164994 A1 | 5/2022 | Joshi | |

FOREIGN PATENT DOCUMENTS

| | | |
|---|---|---|
| CN | 104408689 | 3/2015 |
| CN | 106651942 | 5/2017 |
| CN | 108632607 | 10/2018 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| WO | 200004506 | 1/2000 |
| WO | 2013022540 | 2/2013 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

International Search Report and Written Opinion from PCT/US2020/054145, dated Feb. 3, 2021, pp. 1-17.
International Preliminary Report from PCT/US2020/054145, dated Apr. 14, 2022, pp. 1-9.
Robert Cohen, "CE 3.2 point-based prediction for point loud compression", dated Apr. 2018, pp. 1-6.
Pragyana K. Mishra, "Image and Depth Coherent Surface Description", Doctoral dissertation, Carnegie Mellon Jniversity, The Robotics Institute, Mar. 2005, pp. 1-152.
U.S. Appl. No. 17/718,647, filed Apr. 12, 2022, Alexandros Tourapis, et al.
Jang el al., Video-Based Point-Cloud-Compression Standard in MPEG: From Evidence Collection to Committee Draft [Standards in a Nutshell], IEEE Signal Processing Magazine, Apr. 2019.
Ekekrantz, Johan, et al., "Adaptive Cost Function for Pointcloud Registration," arXiv preprint arXiv: 1704 07910 (2017), pp. 1-10.
Vincente Morell, et al., "Geometric 3D point cloud compression", Copyright 2014 Elsevier B.V. All rights reserved, pp. 1-18.
U.S. Appl. No. 17/523,826, filed Nov. 10, 2021, Mammou, et a.
Chou, et al., "Dynamic Polygon Clouds: Representation and Compression for VR/AR", Arxiv Id: 1610.00402, Published Oct. 3, 2016, pp. 1-28.
U.S. Patent Application Serial No. 17/804,477 filed May 27, 2022, Khaled Mammou, et al.

Jingming Dong, "Optimal Visual Representation Engineering and Learning for Computer Vision", Doctoral Dissertation, UCLA, 2017, pp. 1-151.
Khaled Mammou et al., "Working Draft of Point Cloud Coding for Category 2 (Draft 1)", dated Apr. 2018, pp. 1-38.
Khaled Mammou et al., "Input Contribution", dated Oct. 8, 2018, pp. 1-42.
Benjamin Brass et al., "High Effeciency Video Coding (HEVC) Text Specification Draft 8", dated Jul. 23, 2012, pp. 1-86.
JunTaek Park et al., "Non-Overiapping Patch Packing in TMC2 with HEVC-SCC", dated Oct. 8, 2018, pp. 1-6.
Ismael Daribo, et al., "Efficient Rate-Distortion Compression on Dynamic Point Cloud for Grid-Pattem-Based 3D Scanning Systems", 3D Research 3.1, Springer, 2012, pp. 1-9.
Cohen Robert A et al., "Point Cloud Attribute Compression Using 3-D Intra Prediction and Shape-Adaptive Transforms", dated Mar. 30, 2016, pp. 141-150.
Sebastian Schwarz, et al., "Emerging MPEG Standards for Point Cloud Compression", IEEE Journal on Emerging and Selected Topics In Circuits and Systems, vol. 9, No. 1, Mar. 2019, pp. 133-148.
Li Li, et al., Efficient Projected Frame Padding for Video-based Point Cloud Compression, IEEE Transactions on Multimedia, doi: 10.100/TMM.2020.3016894, 2020, pp. 1-14.
Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.
Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.
Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.
'Bin Lu, et al., ""Massive Point Cloud Space Management Method Based on Octree-Like Encoding"", Arabian Journal forScience Engineering, https://doi.org/10.1007/s13369-019-03968-7, 2019, pp. 1-15.
Wikipedia, ""k-d tree"", Aug. 1, 2019, Retrieved from URL: https://en.wikipedia.org/w.indec.php? title=Kd_tree&oldid=908900837, pp. 1-9.
'David Flynn et al., ""G-PCC: A hierarchical geometry slice structure"", MPEG Meeting, Retrieved from http://phenix.intevry.fr/mpeg/doc_end_user/documents/131_Online/wg11/m54677-v1-m54677_vl.zip, Jun. 28, 2020, pp. 1-9.
""G-PCC Future Enchancements"", MPEG Metting, Oct. 7-11, 2019, (Motion Picture Expert Group of ISO/IECJTC1/SC29-WG11), Retrieved from http://phenix.int-evry.fr/mpeg/doc_end_user/documents/128_Geneva/wg11/w18887.zipw18887/w18887 on Dec. 23, 2019, pp. 1-30.
Miska M. Hannuksela, "On Slices and Tiles", JVET Meeting, The Joint Video Exploration Team of ISO/IEC, Sep. 25, 2018, pp. 1-3.
David Flynn, "International Organisation for Standardisation Organisation International De Normalisation ISO/IEC JTC1/SC29/WG11 Coding of Moving Pictures and Audio", dated Apr. 2020. pp. 1-9.
R. Mekuria, et al., "Design, Implementation and Evaluation of a Point Cloud Codec for Tele-Immersive Video", IEEE Transactions on Circuits and Systems for Video Technology 27.4, 2017, pp. 1-14.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
Tim Golla et al., "Real-time Point Cloud Compression", IROS, 2015, pp. 1-6.

(56) References Cited

OTHER PUBLICATIONS

Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Tilo Ochotta et al., "Image-Based Surface Compression", dated Sep. 1, 2008, pp. 1647-1663.
U.S. Appl. No. 17/691,754, filed Mar. 10, 2022, Khaled Mammou.
Stefan Gumhold et al., "Predictive Point-Cloud Compression", dated Jul. 31, 2005, pp. 1-7.
Pierre-Marie Gandoin et al., "Progressive Lossless Compression of Arbitrary Simplicial Complexes", Dated Jul. 1, 2002, pp. 1-8.
Ruwen Schnabel et al., "Octree-based Point-Cloud Compression", Eurographics Symposium on Point-Based Graphics, 2006, pp. 1-11.
Yuxue Fan et al., "Point Cloud Compression Based on Hierarchical Point Clustering", Signal and Information Processing Association Annual Summit and Conference (APSIPA), IEEE, 2013, pp. 1-7.
Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.
Garcia, et al., "Context-Based Octree Coding for Point Cloud Video", 2017 IEEE International Conference on Image Processing (ICIP), 2017, pp. 1412-1416.
Merry et al., Compression of dense and regular point clouds, Proceedings of the 4th international conference on Computer graphics, virtual reality, visualisation and interaction in Africa (pp. 15-20). ACM. (2006, January).
Lustosa et al., Database system support of simulation data, Proceedings of the VLDB Endowment 9.13 (2016) op. 1329-1340.
Hao Liu, et al., "A Comprehensive Study and Comparison of Core Technologies for MPEG 3D Point Cloud Compression", arXiv:1912.09674v1, Dec. 20, 2019, pp. 1-17.
Styliani Psomadaki, "Using a Space Filing Curve For The Management of Dynamic Point Cloud Data in a Relational DBMS", Nov. 2016, pp. 1-158.
Remi Cura et al., "Implicit Lod for Processing and Classification in Point Cloud Servers", dated Mar. 4, 2016, pp. 1-18.
Yan Huang et al., Octree-Based Progressive Geometry Coding of Point Clouds', dated Jan. 1, 2006, pp. 1-10.
Khaled Mammou, et al., "G-PCC codec description v1", International Organisation for Standardisation, ISO/IEC JTC1/SC29/WG11, Oct. 2018, pp. 1-32.
"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.
G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.
Jianqiang Liu et al., "Data-Adaptive Packing Method for Compresssion of Dynamic Point Cloud Sequences", dated Jul. 3, 2019, pp. 904-909.
Jorn Jachalsky et al., "D4.2.1 Scene Analysis with Spatio-Temporal", dated Apr. 30, 2013, pp. 1-60.
Lasserre S et al., "Global Motion Compensation for Point Cloud Compression in TMC3", dated Oct. 3, 2018, pp. 1-28.
D. Graziosi et al., "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.
"Continuous improvement of study text of ISO-IEC CD 23090-5 Video-Based Point Cloud Compression" dated May 8, 2019, pp. 1-140,.
Mehlem D. et al., "Smoothing considerations for V-PCC", dated Oct. 2, 2019, pp. 1-8.
Flynn D et al., "G-PCC Bypass coding of bypass bins", dated Mar. 21, 2019, pp. 1-3.
Sharman K et al., "CABAC Packet-Based Stream", dated Nov. 18, 2011, pp. 1-6.
Lasserre S et al., "On bypassed bit coding and chunks", dated Apr. 6, 2020, pp. 1-3.
David Flynn et al., "G-pcc low latency bypass bin coding", dated Oct. 3, 2019, pp. 1-4.
Chuan Wang, et al., "Video Vectorization via Tetrahedral Remeshing", IEEE Transactions on Image Processing, vol. 26, No. 4, Apr. 2017, pp. 1833-1844.
Kerning Cao, et al., "Visual Quality of Compressed Mesh and Point Cloud Sequences", IEEE Access, vol. 8,2020. Pages 171203-171217.

* cited by examiner

PREDICTIVE CODING FOR POINT CLOUD COMPRESSION

PRIORITY CLAIM

This application claims benefit of priority to U.S. Provisional Application Ser. No. 62/909,693, entitled "PREDICTIVE CODING FOR POINT CLOUD COMPRESSION," filed Oct. 2, 2019, and which is incorporated herein by reference in its entirety.

BACKGROUND

Technical Field

This disclosure relates generally to compression and decompression of point clouds comprising a plurality of points, each having associated spatial and/or attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In various embodiments, predictive coding techniques are implemented to compress or otherwise encode information for point clouds, such as spatial or other geometric information or other attribute values. A prediction tree may be generated that is used to predict information for individual points in a point cloud by including prediction techniques and the one or more ancestor nodes in the prediction tree to which the prediction techniques apply. The prediction tree may be encoded for signaling the point cloud information, and subsequently decoded in order to reconstitute the point cloud at a destination.

Figure 1:
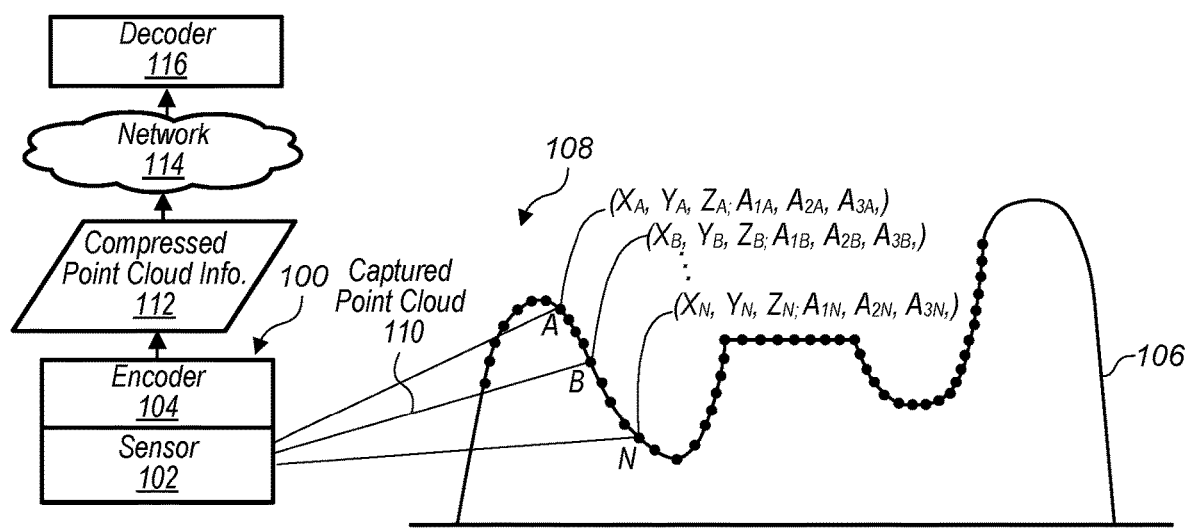
FIG. 1 illustrates a system comprising a sensor that captures information for points of a point cloud and an encoder that compresses attribute information and/or spatial information of the point cloud, where the compressed point cloud information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed spatial and/or attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes geometric or other spatial information of a point cloud in addition to compressing attribute information for attributes of the points of the point cloud.

In some embodiments, some applications may be sensitive to the latency or time that is taken to encode and decode point cloud. While some point cloud encoding techniques may implement features that provide good compression results, such as octrees utilized in Geometry-based Point Cloud Compression (G-PCC), the time to encode and decode point cloud data may limit the utilization of the compression in latency sensitive applications. For example, while octree techniques may provide excellent compression results for dense point cloud, the gain for a sparse point cloud (e.g. a sparse Lidar point cloud) may not be as effect, as the computational complexity, for building the octree and computing features of the octree, such as neighborhood occupancy information, may result in computational costs that outweigh the obtained compression gains. Furthermore, in some scenarios, some coding techniques, like octree-based coding, may incur a high latency (e.g., by using a high number of points before the compression/decompression process could start). Predictive coding techniques, in various embodiments, may provide various performance benefits, including low latency implementations, which can achieve more performant computational costs and time costs. For example, predictive coding techniques as discussed below may be implemented for low latency or other latency sensitive applications, allow for low delay streaming, and be implemented with low complexity decoding.

FIG. 1 illustrates a system comprising a sensor that captures information for points of a point cloud and an encoder that compresses spatial and/or attribute information of the point cloud, where the compressed spatial and/or attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed point cloud information 112) that is transmitted via network 114 to decoder 116. In some embodiments, a compressed version of the point cloud, such as compressed point cloud information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Figure 2A:
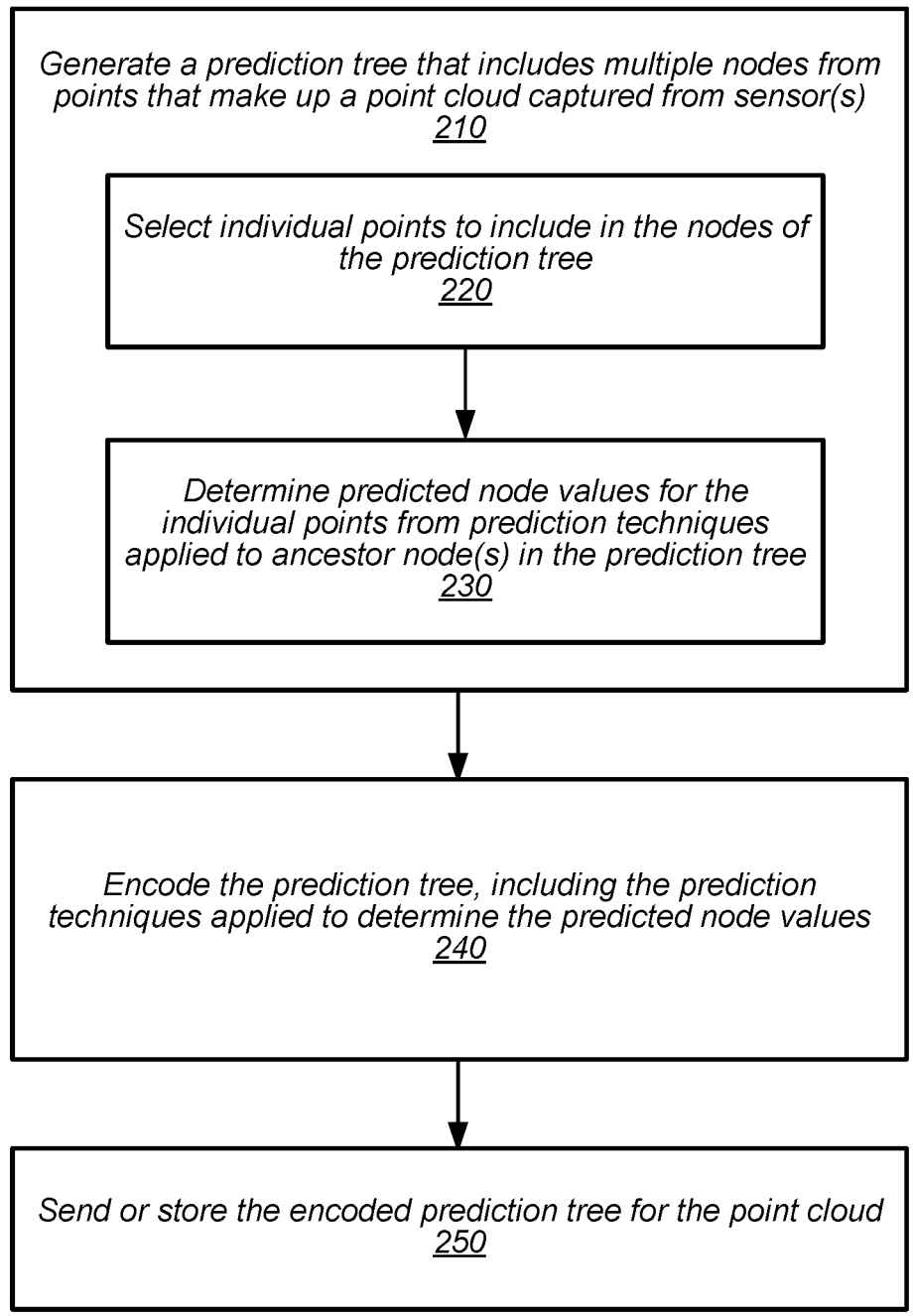
FIG. 2A is a high-level flowchart illustrating various techniques for predictive coding for point clouds, according to some embodiments.

FIG. 2A is a high-level flowchart illustrating various techniques for predictive coding for point clouds, according to some embodiments. As indicated at 210, a prediction tree may be generated that includes multiple nodes from points that make up a point cloud captured from sensor(s), in various embodiments. A prediction tree may serve as a prediction structure, where each point in the point cloud is associated with a node (sometimes referred to as a vertex) of the prediction tree, in some embodiments. In some embodiments, each node may be predicted from only the ancestors of the node in the tree.

Figure 3:
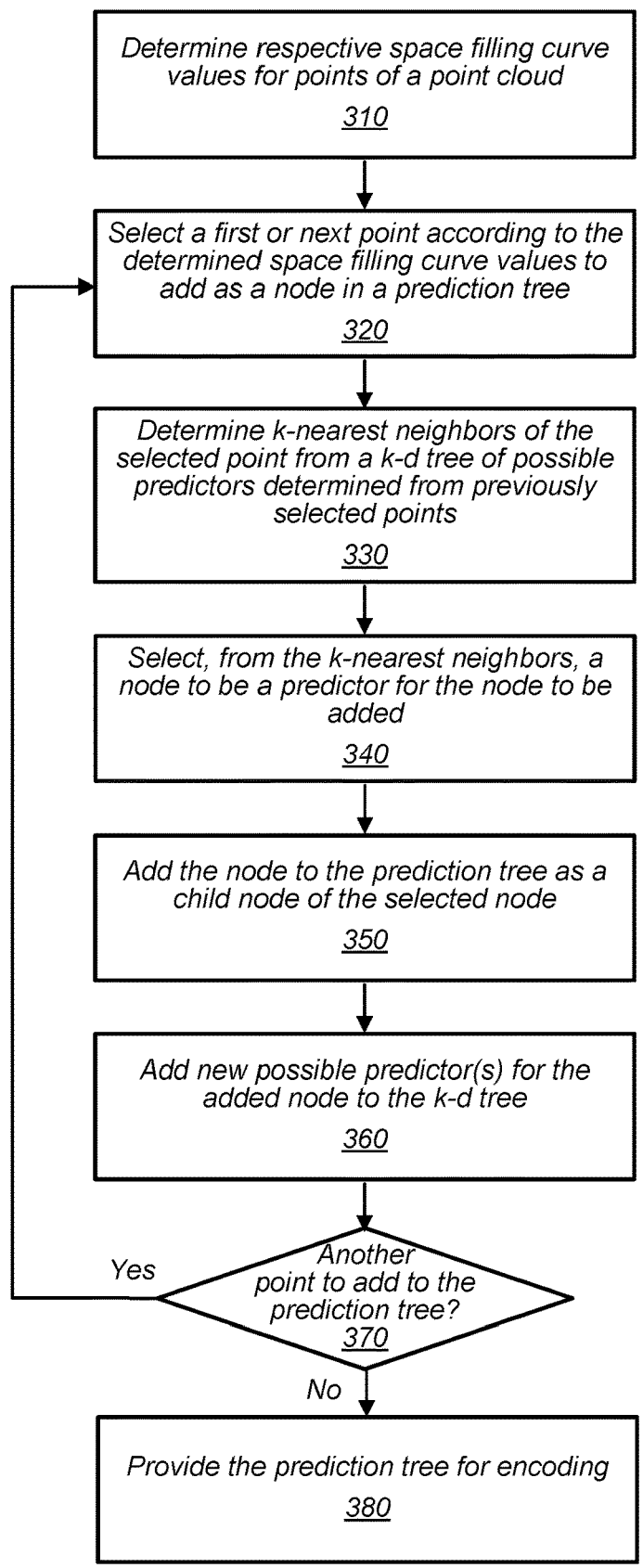
FIG. 3 is a high-level flowchart illustrating various techniques for generating a prediction tree according to a space filling curve, according to some embodiments.
Figure 4:
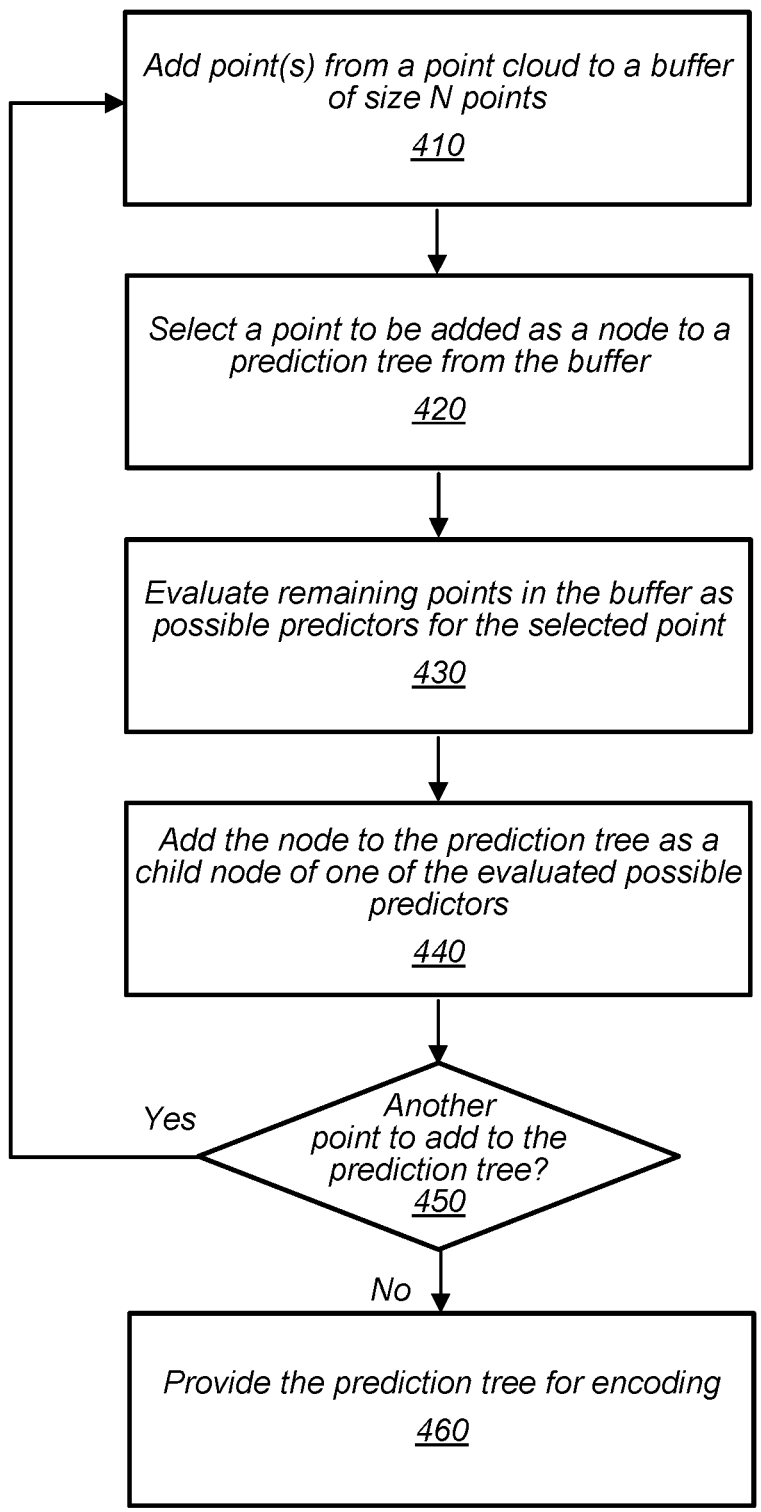
FIG. 4 is a high-level flowchart illustrating various techniques for generating a prediction tree according to a buffer of possible predictors, according to some embodiments.

As part of generating the prediction tree, individual points of the point cloud may be selected for inclusion in the prediction tree, as indicated at 220. As indicated at 230, predicted node values may be determined for the individual points from prediction techniques applied to ancestor nodes in the prediction tree, in some embodiments. FIGS. 3 and 4, discussed below, provide examples prediction tree generation techniques.

Various prediction techniques may be implemented to predict a node from ancestor nodes. These prediction techniques may be signaled as prediction modes or prediction indicators (e.g., mapped to prediction mode values "0"=prediction technique A, "1"=prediction technique B, and so on). In some embodiments, a node in the prediction tree (corresponding to one point in the point cloud) may not have a prediction technique as it may be the first or root node of the prediction tree. The prediction mode for such a node may be indicated as "none" or "root" in some embodiments. The actual information (e.g., spatial information and/or attribute information) for such a node may be encoded instead of the prediction information encoded for other nodes in the tree that is used to derive the actual information.

Figure 2B:
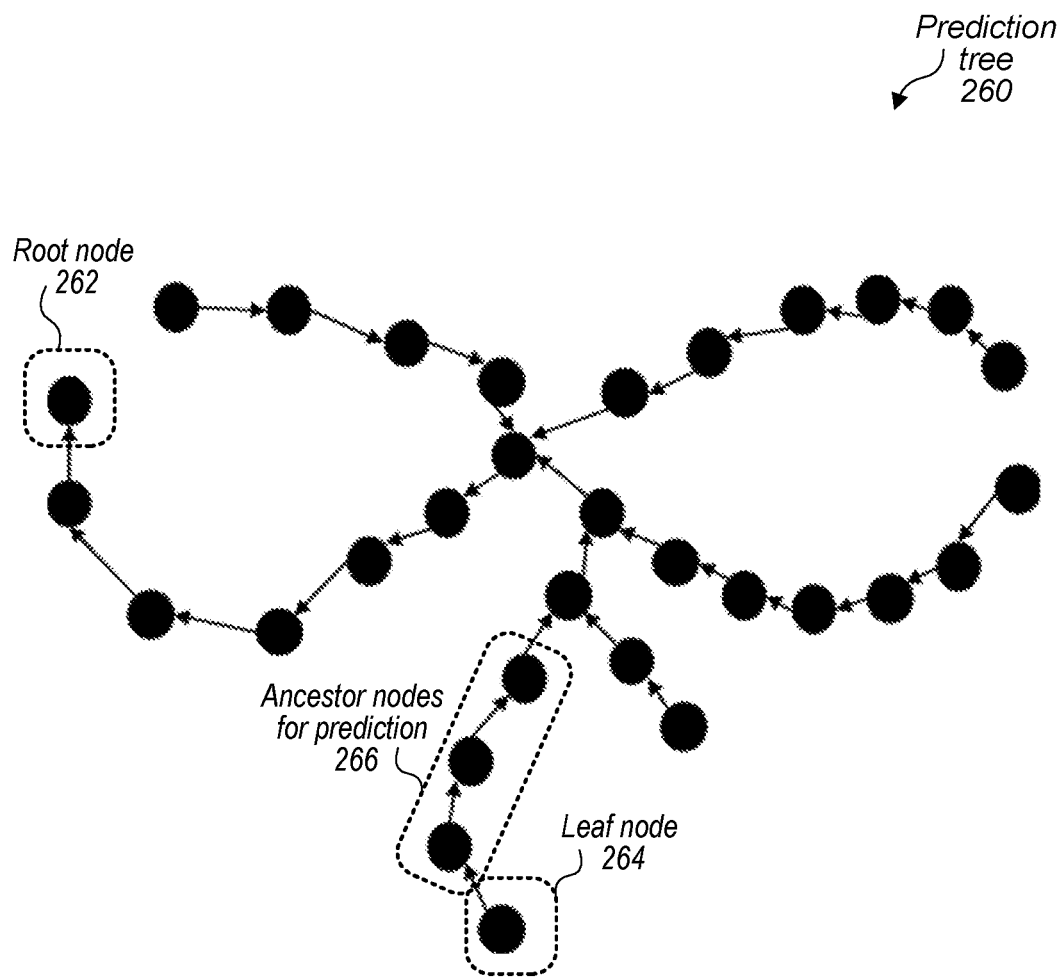
FIG. 2B is an example prediction tree, according to some embodiments.

As illustrated in FIG. 2B, prediction tree 260 may include various nodes that are predicted according to a prediction technique applied to one or more ancestor nodes, indicated by the arrows. For example, leaf node 264 may be predicted by ancestor nodes 266, according to various ones of the prediction techniques discussed below. Some nodes, like root node 262, may not be predicted but encoded as part of prediction tree 260 using the actual values.

In some embodiments, delta prediction may be implemented or supported as a prediction technique. Delta prediction may use a position of a parent node of a current node as a predictor the current node.

In some embodiments, linear prediction may be implemented or supported as a prediction technique. For example, in linear prediction, a point "p0" may be the position of a parent node and "p1" may be the position of a grandparent node. The position of a current node may be predicted as $(2 \times p0 - p1)$.

In some embodiments, parallelogram prediction may be implemented or supported as a prediction technique. For example, in parallelogram prediction "p0" may be the position of the parent node, "p1" the position of the grandparent node, and "p2" be the position of the great-grandparent node. A current node's position may then be determined as $(p0+p1-p2)$.

In some embodiments, rectangular prediction may be implemented or supported as a prediction technique. For example, in rectangular prediction "p0" may be the position of the parent node, "p1" the position of the grandparent node, and "p2" be the position of the great-grandparent node. A current node's position may then be determined as (p0+p2−p1).

In some embodiments, polar prediction may be implemented or supported as a prediction technique. For example, in polar prediction $(\theta_0, r_0, z_0)$ may be the polar coordinates of the parent node and $(\theta_1, r_1, z_1)$ may be the polar coordinates of the grandparent node. The position of the current node is predicted as $$\left(2\theta_0 - \theta_1, \frac{r_0 + r_1}{2}_0, \frac{z_0 + z_1}{2}\right).$$

In some embodiments, modified polar prediction may be implemented or supported as a prediction technique. For example, in modified polar prediction $(\theta_0, r_0, z_0)$ may be the polar coordinates of the parent node and $(\theta_1, r_1, z_1)$ be the polar coordinates of the grandparent node. The position of the current node may be predicted as $(2\theta_0-\theta_1, r_0, z_0)$.

In some embodiments, average prediction may be implemented or supported as a prediction technique. For example, in average prediction "p0" may be the position of the parent node and "p1" the position of the grandparent node. The position of the current node may be predicted as ((p0+p1)/2).

In some embodiments, average prediction of order 3 may be implemented or supported as a prediction technique. For example, in average prediction of order 3, "p0" may be the position of the parent node, "p1" may be the position of the grandparent node and "p2" may be the position of the great-grandparent node. The position of the current node may be predicted as ((p0+p1+p2)/3).

In some embodiments, average prediction of order k may be implemented or supported as a prediction technique. For example, in average prediction of order k, the positions of ancestor nodes of the current node may be averaged up to the order k ancestor nodes.

The choice of the prediction technique to be applied for each node of the prediction tree may be determined according to a rate-distortion optimization procedure, in some embodiments. In some embodiments, the choice may be adaptive per node or per group of nodes. In some embodiments, the choice may be signaled explicitly in the bitstream or may be implicitly derived based on the location of the node if the prediction graph and decoded positions and prediction modes of the node ancestors.

As indicated at 240, the prediction tree may be encoded, including the prediction techniques applied to determine the predicted node values. For example, a node may be encoded along with a number of child nodes, and respective prediction modes to determine each child node (which may be the same for each child, different for each child, or independently determined for each child (even if determined to be the same) in some embodiments). In various embodiments, the prediction tree may be encoded by traversing the tree in a predefined order (e.g., depth first, breath first) and encoding for each node the number of its children. The positions of the nodes may be encoded by encoding first the chosen prediction mode and then the obtained residuals after prediction, in some embodiments. In some embodiments, the residuals values for the nodes may be encoded with the prediction mode for the nodes as correction values for predicted node values, predicted using the indicated prediction modes. In some embodiments, the residual may be determined based on a spatial difference between a predicted spatial location for one of the points corresponding to a given node and a spatial location for the point in the point cloud. Also, in some embodiments, the residuals may be determined based on an attribute value difference between a predicted attribute value for one of the points corresponding to a given node and an attribute value for the point in the point cloud. In various embodiments, the number of children, the prediction mode and the prediction residuals could be entropy encoded (e.g., arithmetically encoded) in order to further exploit statistical correlations. The residuals could be encoded by compressing the sign of each residue, the position of the most significant bit (equivalent to Floor(Log2 (Abs(residue)))) and the binary representation of the remaining bits, in some embodiments. Correlations between the X, Y, Z coordinates could be exploited by using a different entropy/arithmetic context based on the encoded values of the first encoded components, in some embodiments.

As indicated at 250, the encoded prediction tree for the point cloud may be sent or stored, according to the various examples discussed above with regard to FIG. 1 and below with regard to FIGS. 7A, 8 and 9.

FIG. 3 is a high-level flowchart illustrating various techniques for generating a prediction tree according to a space filling curve, according to some embodiments. As indicated at 310, a space filling curve (e.g., a Morton order) may be used to determine values (e.g., Morton codes) for points of a point cloud, in some embodiments. As indicated at 320, a first or next point according to the space filling curve values may be selected to add as a node in a prediction tree, in some embodiments.

As indicated at 330, k-nearest neighbors of the selected point may be determined from a k-dimensional (k-d) tree of possible predictors determined from previously selected points, in some embodiments. As indicated at 340, from the k-nearest neighbors, a node may be selected to a predictor for the node to be added, in some embodiments. For example, the node may be selected according to the magnitude of prediction residuals, the number of children the node has, and/or the frequency of the chosen prediction mode, in some embodiments. As indicated at 350, the child node may be added to the prediction tree as a child node of the selected node, in some embodiments. New possible predictor(s) (e.g., predicted values generated from the prediction techniques discussed above) for the added node may be added to the k-d tree, as indicated at 360, in some embodiments. As indicated at 380, if another point remains to be added to the prediction tree, then the features of the technique may be repeated. When all points are added, the prediction tree may be provided for encoding, as indicated at 380.

In some embodiments, the points may be decomposed into various levels of detail (LODs) before performing the techniques illustrated in FIG. 3. For example, the LODs may be encoded starting from the coarsest LOD to the finest LOD. In such an embodiment, the potential predictors and predicted positions in the k-d tree. In some embodiments, different quantization parameters may be used for a different LOD (e.g., a smaller quantization step for the coarsest LOD) in order to obtain better RD performance. In some embodiments, functionalities of temporal scalability, spatial scalability, quality scalability, and progressive transmission may be implemented utilizing LODs or other hierarchical prediction structure. In this way, the coarse LOD may be streamed and decoded first, and then progressively more granular LODs may be streamed and decoded adaptively based on network conditions, terminal capabilities, and a distance of the point cloud to a viewer, in some embodiments.

In some embodiments, node information for a point cloud at multiple moments in time may be encoded, such as for a dynamic point cloud. In some such embodiments, at least some of the prediction techniques included in node information for individual ones of the child nodes may comprise prediction techniques that use ancestor nodes of the individual ones of the child nodes that are included in other ones of the frames in time to predict node values for the individual ones of the nodes in a different one of the frames in time. For example a prediction technique for a current moment in time may use child nodes in the current moment in time or in previous moments in time as inputs to the prediction technique.

For a lower latency approach (when compared with the techniques of FIG. 3), an encoder may processes the input point cloud in the same order it is received, in some embodiments. A limited buffering buffer N may be implemented that is measured in terms of number of buffered points B is allowed (e.g., B=1024 points), in some embodiments. B may be a decoder parameter that could be adjusted depending on the how stringent the application latency requirements are. When looking for the best predictor for each vertex, the encoder would consider only the points that are in the buffer, in some embodiments. FIG. 4 is a high-level flowchart illustrating various techniques for generating a prediction tree according to a buffer of possible predictors, according to some embodiments.

As indicated at 410, point(s) from a point cloud may be added to a buffer of size N points, in some embodiments. As indicated at 420, a point to be added as a node to a prediction tree may be selected, from the buffer, in some embodiments. As indicated at 430, remaining points in the buffer may be evaluated as possible predictors for the selected point. For instance, as discussed above with regard to FIG. 3, the remaining points in the buffer may be evaluated according to the magnitude of prediction residuals, the number of children the corresponding node of the points has, and/or the frequency of the chosen prediction mode, in some embodiments.

As indicated at 440, the node may be added to the prediction tree as a child node of one of the evaluated possible predictors, in some embodiments. If another point remains to be added to the prediction tree, then as indicated by the positive exit from 450, elements 410 through 440 may be added to the prediction tree. When all points have been added to the prediction tree, then the prediction tree may be provided for encoding, in some embodiments.

In some embodiments, the prediction tree could be used to compress or otherwise encode spatial information, such as geometry, or various other attributes (e.g., color information). In some scenarios, the same predictors of different nodes could be used and potentially explicitly encoded in the bitstream for the attributes. The scalability and low-latency properties can be directly be inherited from the prediction tree generation strategy.

In an alternative embodiment, the predictive coding technique may be applied only for the spatial information, while alternative techniques may be used for encoding attributes (e.g., lifting, Region Adaptive Hierarchical Transform (RAHT) or prediction scheme for the attributes according to the G-PCC attributes encoding scheme). In order to enable low latency application, the Morton re-ordering of the points that would otherwise be applied before the attributes coding would be disabled, in some embodiments.

Figure 5:
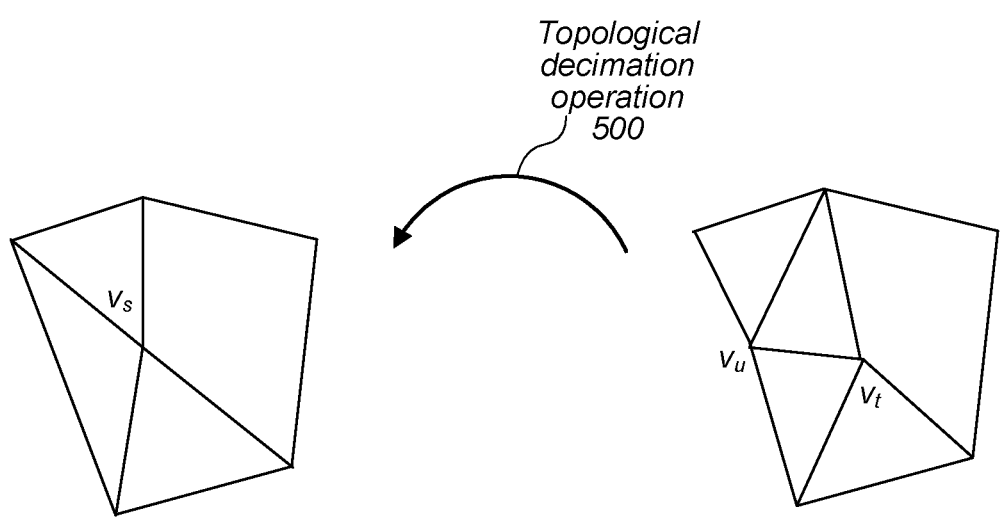
FIG. 5 is a logical diagram illustrating an example topological decimation operation, according to some embodiments

In some embodiments, hierarchical prediction and lifting schemes (e.g., defined in G-PCC) could be modified to exploit the prediction scheme to guide the decimation and nearest neighbor's detection processes. For example, the decimation process could be applied by using edge collapse operators or any other topological decimation operator. FIG. 5 is a logical diagram illustrating an example topological decimation operation, according to some embodiments. Topological decimation operation 500 may collapse or combine vu and $v_t$ into $v_s$.

The criteria to choose the edge-collapse operation or other topological decimation operations to be applied to generate LODs could be guided by distance criteria (i.e., distance between the merged points) and/or explicit information included by the encoder in the bitstream, in some embodiments. The nearest neighbor search could be restricted to the neighbors in the tree structure or could use the prediction tree structure to accelerate it, in some embodiments.

Figure 6:
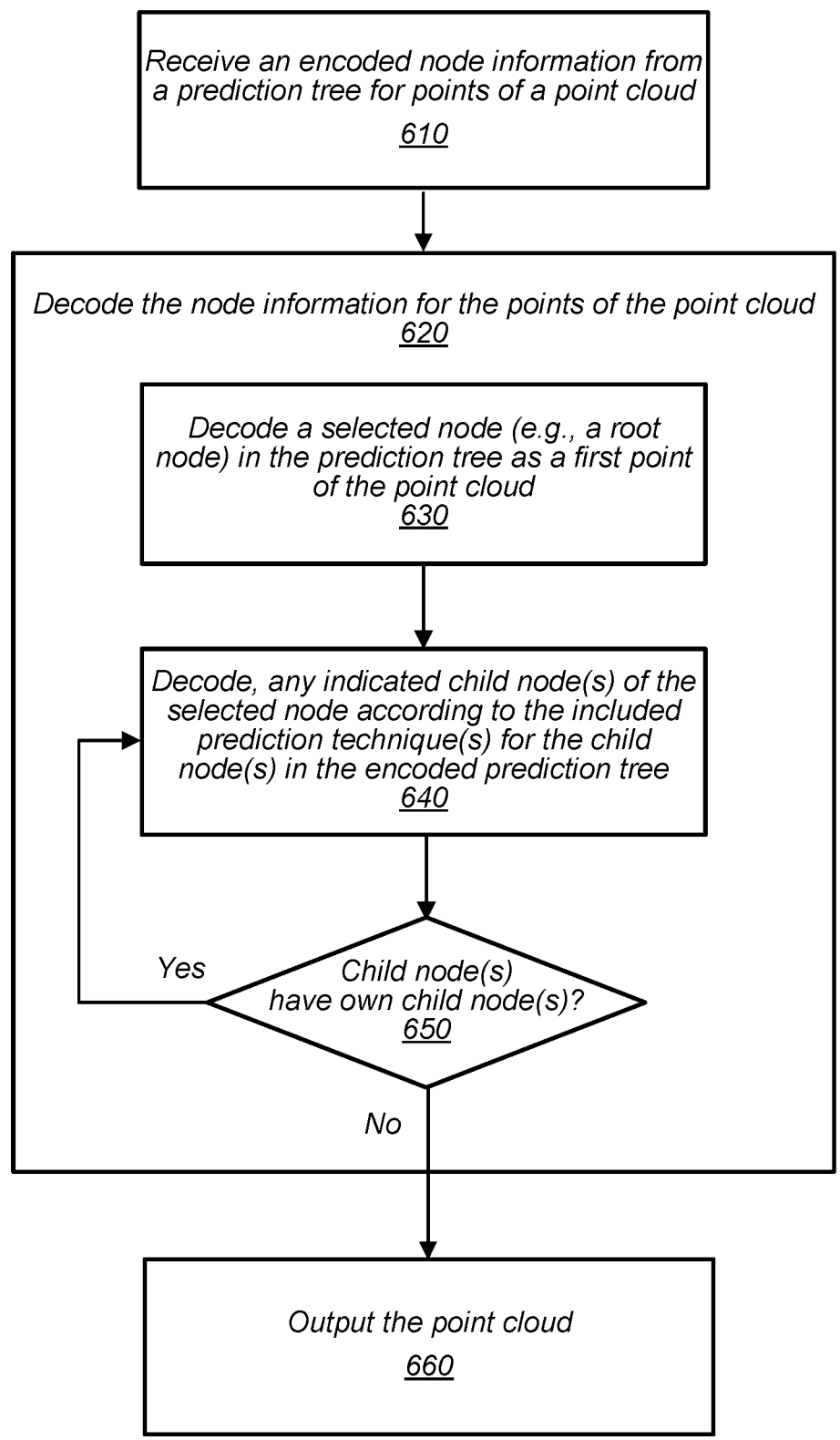
FIG. 6 is a high-level flowchart illustrating various techniques for decoding a prediction tree for a point cloud, according to some embodiments.

FIG. 6 is a high-level flowchart illustrating various techniques for decoding a prediction tree for a point cloud, according to some embodiments. As indicated at 610 an encoded prediction tree for points of a point cloud may be received, in some embodiments. As indicated at 620, the prediction tree for the points of the point cloud may be decoded. For example, techniques to undo entropy or other encoding techniques may be performed.

In at least some embodiments, the encoded prediction tree may include enough information to generate the prediction tree from the decoded contents of the prediction tree (e.g., without performing the same tree generation techniques discussed above with regard to FIGS. 3 and 4). For example, as indicated at 630, a selected node (e.g. a root node) may be decoded) as a first point in the point cloud. Then, as indicated at 640, any child node(s) of the selected node may be decoded according to the included prediction techniques for the child nodes, in some embodiments.

A determination may be made, as indicated at 650, as to whether any of the child node(s) have child nodes of their own, in some embodiments. For example, the included number of child nodes may be considered for each included point. If any child nodes exist, then the techniques at 640 may be performed again, in some embodiments. Once complete the decoded point cloud from the prediction tree may be output, as indicated at 660 (e.g., for further processing, display, and/or storage).

Figure 7A:
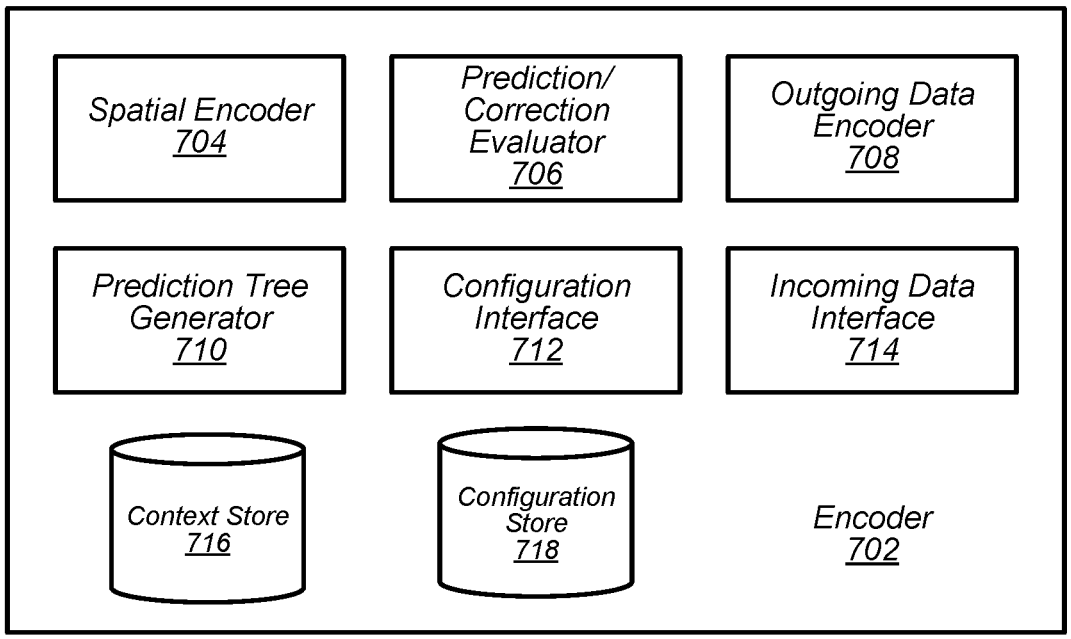
FIG. 7A illustrates components of an encoder, according to some embodiments.

FIG. 7A illustrates components of an encoder, according to some embodiments.

Encoder 702 may be a similar encoder as encoder 104 illustrated in FIG. 1A. Encoder 702 includes spatial encoder 704, octree tree generator 710, prediction/correction evaluator 706, incoming data interface 714, and outgoing data interface 708. Encoder 702 also includes context store 716 and configuration store 718.

In some embodiments, a spatial encoder, such as spatial encoder 704, may compress spatial information associated with points of a point cloud, such that the spatial information can be stored or transmitted in a compressed format. In some embodiments, a spatial encoder, such as spatial encoder 704, may utilize octrees to compress spatial information for points of a point cloud as discussed in more detail herein.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud.

A prediction tree generator, such as prediction tree generator 710, may implement various techniques discussed above to generate a prediction tree to be encoded.

A prediction/correction evaluator, such as prediction/correction evaluator 706 of encoder 702, may determine predicted attribute values for points of a point cloud based on an inverse distance interpolation method using attribute values of the K-nearest neighboring points of a point for whom an attribute value is being predicted. The prediction/correction evaluator may also compare a predicted attribute value of a point being evaluated to an original attribute value of the point in a non-compressed point cloud to determine an attribute correction value. In some embodiments, a prediction/correction evaluator, such as prediction/correction evaluator 706 of encoder, 702 may adaptively adjust a prediction strategy used to predict attribute values of points in a given neighborhood of points based on a measurement of the variability of the attribute values of the points in the neighborhood.

An outgoing data encoder, such as outgoing data encoder 708 of encoder 702, may encode attribute correction values and assigned attribute values included in a compressed attribute information file for a point cloud. In some embodiments, an outgoing data encoder, such as outgoing data encoder 708, may select an encoding context for encoding a value, such as an assigned attribute value or an attribute correction value, based on a number of symbols included in the value. In some embodiments, values with more symbols may be encoded using an encoding context comprising Golomb exponential encoding, whereas values with fewer symbols may be encoded using arithmetic encoding. In some embodiments, encoding contexts may include more than one encoding technique. For example, a portion of a value may be encoded using arithmetic encoding while another portion of the value may be encoded using Golomb exponential encoding. In some embodiments, an encoder, such as encoder 702, may include a context store, such as context store 716, that stores encoding contexts used by an outgoing data encoder, such as outgoing data encoder 708, to encode attribute correction values and assigned attribute values.

In some embodiments, an encoder, such as encoder 702, may also include an incoming data interface, such as incoming data interface 714. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 714 of encoder 702.

In some embodiments, an encoder, such as encoder 702, may further include a configuration interface, such as configuration interface 712, wherein one or more parameters used by the encoder to compress a point cloud may be adjusted via the configuration interface. In some embodiments, a configuration interface, such as configuration interface 712, may be a programmatic interface, such as an API. Configurations used by an encoder, such as encoder 702, may be stored in a configuration store, such as configuration store 718.

In some embodiments, an encoder, such as encoder 702, may include more or fewer components than shown in FIG. 7A.

In some embodiments, an outgoing data encoder, such as outgoing data encoder 708 may encode the tree structure, per-node prediction modes and prediction residuals according to a syntax such as:

| geometry_predtree_data( ) { | Descriptor |
|---|---|
|   PtnNodeIdx = 0 | |
|   do { | |
|     geometry_predtree_node( PtnNodeIdx ) | |
|   } while( ++PtnNodeIdx < NumNodesToEncode ) | |
| } | |
| geometry_predtree_node( nodeIdx ) { | |
|   pnt_child_cnt[ nodeIdx ] | ae(v) |
|   ptn_pred_mode[ nodeIdx ] | ae(v) |
|   for( k = 0; k < 3; k++ ) { | |
|     ptn_residual_eq0_flag [ k ] | ae(v) |
|     if( !ptn_residual_eq0_flag[ k ] ) { | |
|       ptn_residual_sign_flag[ k ] | ae(v) |
|       ptn_residual_abs_log2[ k ] | ae(v) |
|       ptn_residual_abs_remaining[ k ] | ae(v) |
|     } | |
|   } | |
|   for( i = 0; i < ptn_child_cnt; i++) /*recurse into each child */ | |
|     geometry_predtree_node( ++PtnNodeIdx ) | |
| } | |

Where, ptn_child_cnt[nodeIdx] is the number of direct child nodes of the current predictive tree node present in the geometry predictive tree.

Where, ptn_pred_mode[nodeIdx] is a mode used to predict the position associated with the current node. When ptn_pred_mode[nodeIdx] is equal to 0, the predicted point position for the current node is zero. When ptn_pred_mode[nodeIdx] is equal to 1, the predicted point position for the current node is the reconstructed position of the current node's parent. When ptn_pred_mode[nodeIdx] is equal to 2, the predicted point position for the current node is a linearly predicted from the reconstructed positions of the current node's parent and grandparent. When ptn_pred_mode[nodeIdx] is equal to 3, the predicted point position for the current node is determined using parallelogram prediction from the reconstructed positions of the current node's parent, grandparent and great grandparent.

Where, ptn_residual_eq0_flag[k], ptn_residual_sign_flag [k], ptn_residual_abs_log2[k], and ptn_residual_abs_remaining[k] together specify the prediction residual of the k-th geometry position component of the nodeIdx-th node. ptn_residual_eq0_flag[k] specifies whether the residual component is equal to zero. ptn_residual_sign_flag[k] equal to 1 indicates that the sign of the residual component is positive. ptn_residual_sign_flag[k] equal to 0 indicates that the sign of the residual component is negative. Any of ptn_residual_sign_flag[k], ptn_residual_abs_log2[k], or ptn_residual_abs_remaining[k] that are not present are inferred to be 0.

The first prediction residual associated with the current tree node may be derived as follows:

```
for (k = 0; k < 3; k++)
    PtnResidual[nodeIdx][k] = (2 × ptn_residual_sign_flag − 1)
```

-continued

```
× (!ptn_residual_eq0_flag[k]
   + ((1 << ptn_residual_abs_log2[k]) >> 1)
   + ptn_residual_abs_remaining[k])
```

Figure 7B:
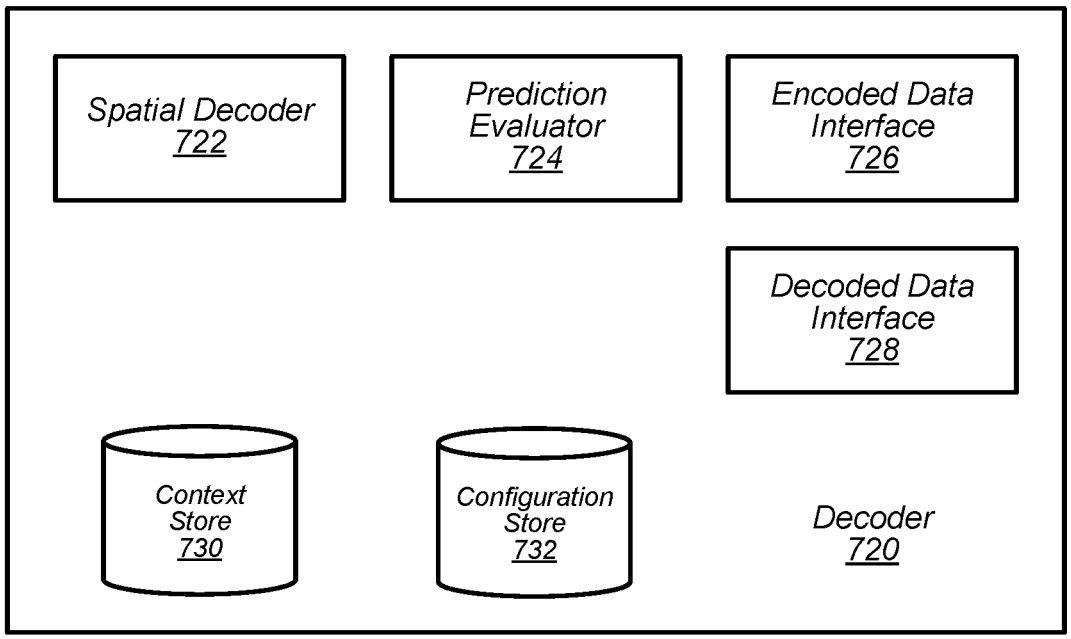
FIG. 7B illustrates components of a decoder, according to some embodiments.

FIG. 7B illustrates components of a decoder, according to some embodiments. Decoder 720 may be a similar decoder as decoder 116 illustrated in FIG. 1A. Decoder 720 includes encoded data interface 726, spatial decoder 722, prediction evaluator 724, context store 730, configuration store 732, and decoded data interface 728.

A decoder, such as decoder 720, may receive an encoded compressed point cloud and/or an encoded compressed attribute information file for points of a point cloud. For example, a decoder, such as decoder 720, may receive a compressed attribute information file and/or a compressed spatial information file. The compressed attribute information file and/or compressed spatial information file may be received by a decoder via an encoded data interface, such as encoded data interface 726. The encoded compressed point cloud may be used by the decoder to determine spatial information for points of the point cloud. For example, spatial information of points of a point cloud included in a compressed point cloud may be generated by a spatial decoder, such as spatial decoder 722. In some embodiments, a compressed point cloud may be received via an encoded data interface, such as encoded data interface 726, from a storage device or other intermediary source, wherein the compressed point cloud was previously encoded by an encoder, such as encoder 104. In some embodiments, an encoded data interface, such as encoded data interface 726, may decode spatial information. For example the spatial information may have been encoded using various encoding techniques as described herein, such as the various techniques for encoding geometry or other spatial information and/or attribute information as a prediction tree.

A prediction evaluator of a decoder, such as prediction evaluator 724, may select a starting point of a minimum spanning tree based on an assigned starting point included in a compressed attribute information file. In some embodiments, the compressed attribute information file may include one or more assigned values for one or more corresponding attributes of the starting point. In some embodiments, a prediction evaluator, such as prediction evaluator 724, may assign values to one or more attributes of a starting point in a decompressed model of a point cloud being decompressed based on assigned values for the starting point included in a compressed attribute information file. A prediction evaluator, such as prediction evaluator 724, may further utilize the assigned values of the attributes of the starting point to determine attribute values of neighboring points. For example, a prediction evaluator may select a next nearest neighboring point to the starting point as a next point to evaluate, wherein the next nearest neighboring point is selected based on a shortest distance to a neighboring point from the starting point in the minimum spanning tree. Note that because the minimum spanning tree is generated based on the same or similar spatial information at the decoder as was used to generate a minimum spanning tree at an encoder, the decoder may determine the same evaluation order for evaluating the points of the point cloud being decompressed as was determined at the encoder by identifying next nearest neighbors in the minimum spanning tree.

A decoder, such as decoder 720, may provide a decompressed point cloud generated based on a received compressed point cloud and/or a received compressed attribute information file to a receiving device or application via a decoded data interface, such as decoded data interface 728. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Exampled Applications for Point Cloud Compression and Decompression

Figure 8:
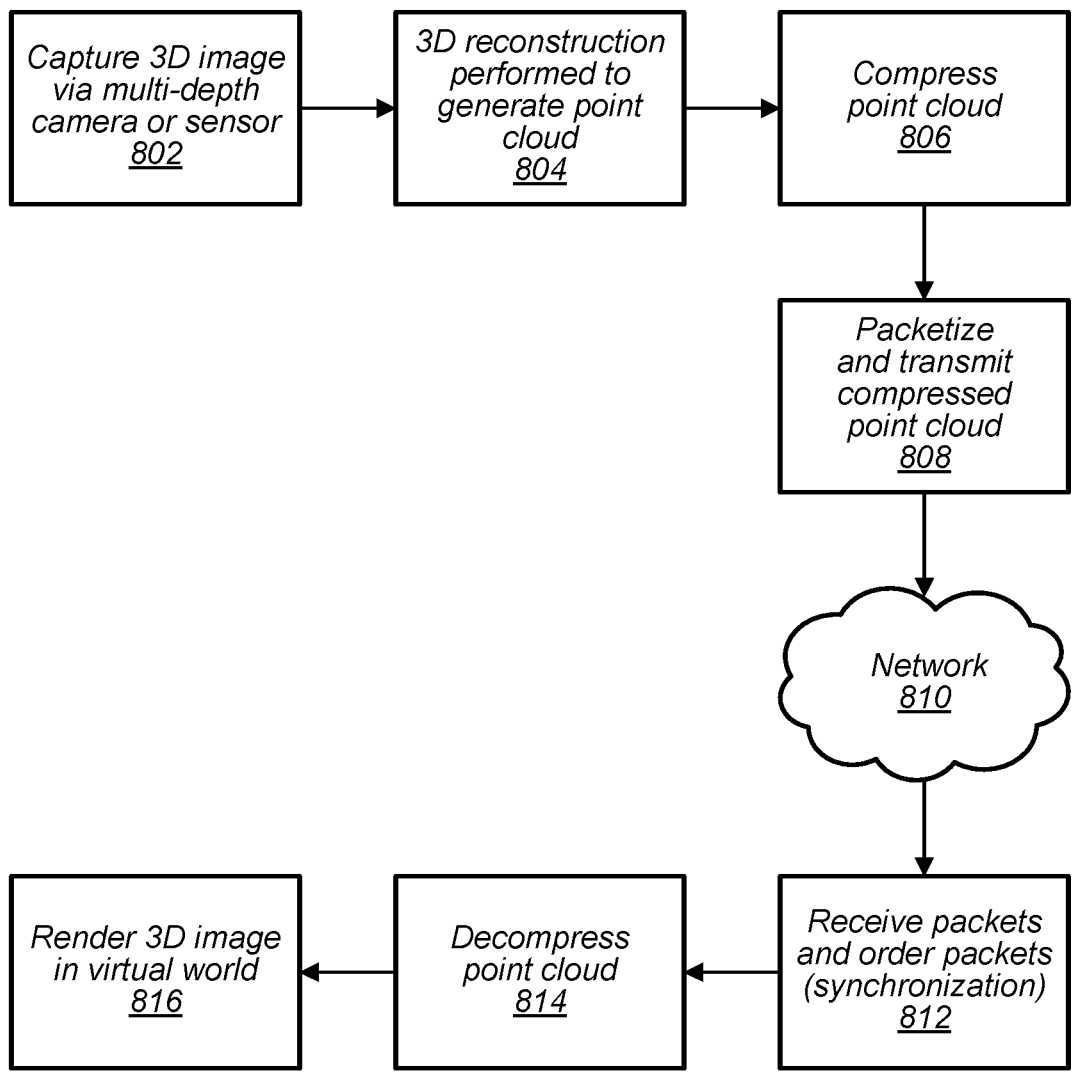
FIG. 8 illustrates compressed point cloud information being used in a 3-D application, according to some embodiments.

FIG. 8 illustrates compressed point clouds being used in a 3-D application, according to some embodiments.

In some embodiments, a sensor, such as sensor 102, an encoder, such as encoder 104 or encoder 202, and a decoder, such as decoder 116 or decoder 220, may be used to communicate point clouds in a 3-D application. For example, a sensor, such as sensor 102, at 1002 may capture a 3D image and at 1004, the sensor or a processor associated with the sensor may perform a 3D reconstruction based on sensed data to generate a point cloud.

At 806, an encoder such as encoder 104 or 202 may compress the point cloud and at 808 the encoder or a post processor may packetize and transmit the compressed point cloud, via a network 810. At 812, the packets may be received at a destination location that includes a decoder, such as decoder 116 or decoder 220. The decoder may decompress the point cloud at 814 and the decompressed point cloud may be rendered at 816. In some embodiments a 3-D application may transmit point cloud data in real time such that a display at 816 represents images being observed at 802. For example, a camera in a canyon may allow a remote user to experience walking through a virtual canyon at 816.

Figure 9:
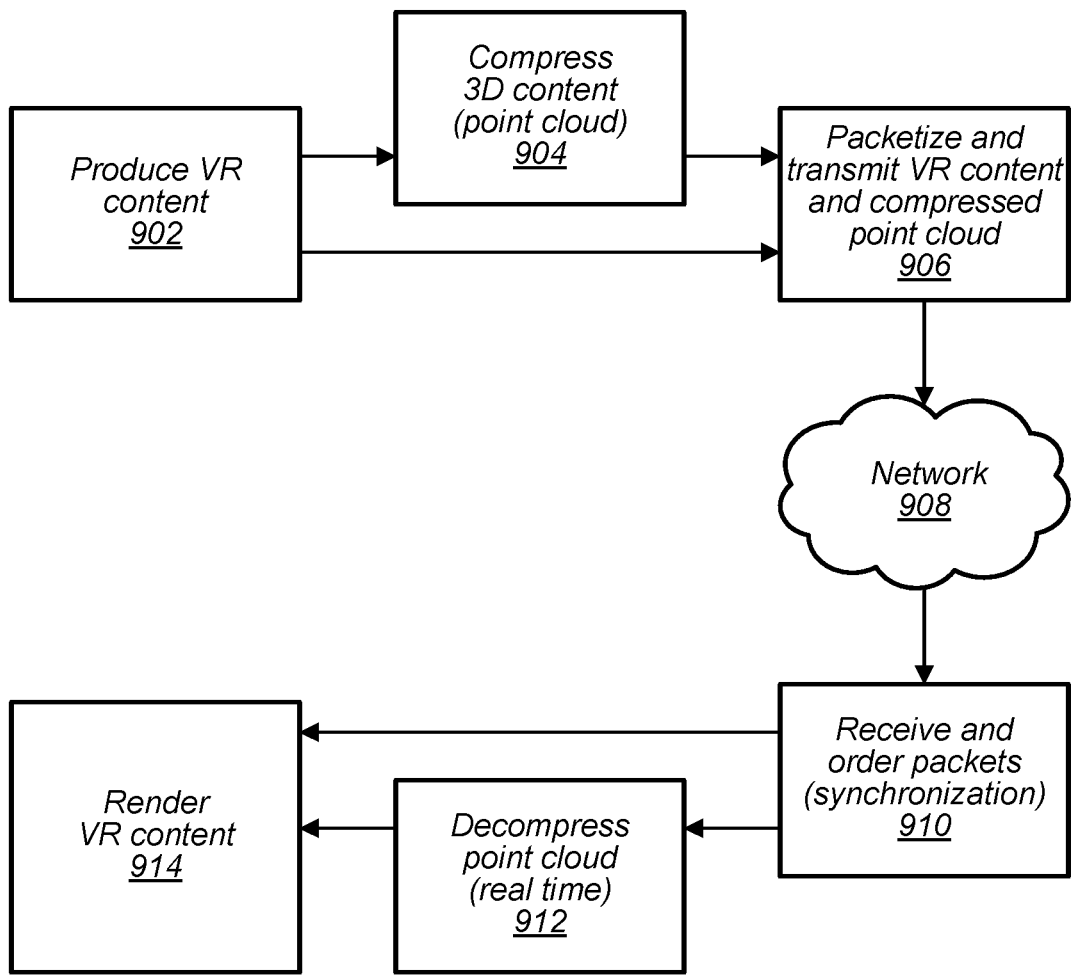
FIG. 9 illustrates compressed point cloud information being used in a virtual reality application, according to some embodiments.

FIG. 9 illustrates compressed point clouds being used in a virtual reality (VR) or augmented reality (AR) application, according to some embodiments.

In some embodiments, point clouds may be generated in software (for example as opposed to being captured by a sensor). For example, at 902 virtual reality or augmented reality content is produced. The virtual reality or augmented reality content may include point cloud data and non-point cloud data. For example, a non-point cloud character may traverse a landscape represented by point clouds, as one example. At 904, the point cloud data may be compressed and at 906 the compressed point cloud data and non-point cloud data may be packetized and transmitted via a network 908. For example, the virtual reality or augmented reality content produced at 902 may be produced at a remote server and communicated to a VR or AR content consumer via network 908. At 910, the packets may be received and synchronized at the VR or AR consumer's device. A decoder operating at the VR or AR consumer's device may decompress the compressed point cloud at 912 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 10:
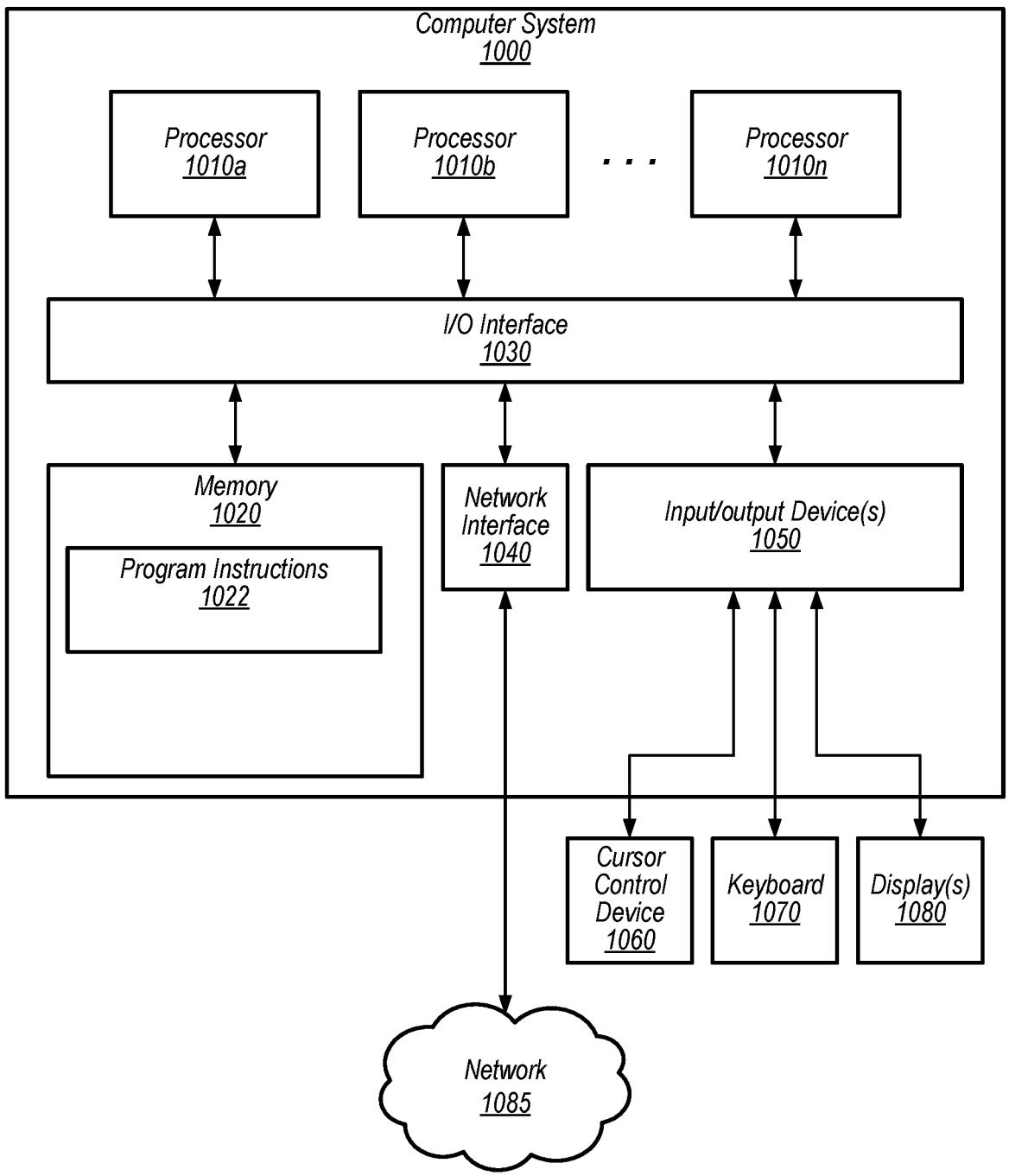
FIG. 10 illustrates an example computer system that may implement an encoder or decoder, according to some embodiments.

FIG. 10 illustrates an example computer system 1000 that may implement an encoder or decoder or any other ones of the components described herein, (e.g., any of the components described above with reference to FIGS. 1-9), in accordance with some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1000, which may interact with various other devices. Note that any component, action, or functionality described above with respect to FIGS. 1-11 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store point cloud compression or point cloud decompression program instructions 1022 and/or sensor data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement an image sensor control application incorporating any of the functionality described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. One or more non-transitory, computer-readable storage media, storing program instructions that when executed on or across one or more computing devices cause the one or more computing devices to:
   generate a prediction tree comprising a plurality of nodes that correspond to a plurality of points that represent a three-dimensional (3D) scene captured using one or more sensors, wherein respective ones of the points captured using the one or more sensors comprise spatial information for the respective points, and wherein, in generating the prediction tree, the program instructions cause the one or more computing devices to:
   select individual ones of the plurality of points to include in respective ones of the plurality of nodes in the prediction tree;
   determine respective predicted node values, for the individual ones of the points, determined using respective prediction techniques applied to one or more ancestor nodes of one or more nodes of the prediction tree representing the individual ones of the points, wherein the one or more ancestor nodes correspond to one or more other nodes in the prediction tree for which corresponding node values are known or have been predicted for one or more other points of the 3D scene;
   encode node information of the prediction tree for the plurality of nodes, wherein the encoded node information comprises, for a given node, an indicator of the respective prediction technique applied to determine the respective predicted node value for the given node; and
   send or store the encoded node information.

2. The one or more non-transitory, computer-readable storage media of claim 1, wherein the predicted node values are predicted spatial values for the individual ones of the selected points.

3. The one or more non-transitory, computer-readable storage media of claim 1, wherein the predicted node values are predicted attribute values for the individual ones of the selected points.

4. The one or more non-transitory, computer-readable storage media of claim 1, wherein the program instructions further cause the one or more computing devices to:
   determine correction values for the predicted node values, wherein the correction values are determined based on:
   a spatial difference between a predicted spatial location for one of the individual ones of the points corresponding to the node and a spatial location for the individual point in the 3D scene; or
   an attribute value difference between a predicted attribute value for one of the individual ones of the points corresponding to the node and an attribute value for the individual point in the 3D scene, wherein encoding the node information from the prediction tree comprises encoding the determined correction values associated with the nodes of the prediction tree.

5. The one or more non-transitory, computer-readable storage media of claim 1, wherein the program instructions further cause the one or more computing devices to:

determine, for the respective nodes of the prediction tree, a number of child nodes belonging to individual ones of the respective nodes of the prediction tree, wherein encoding the node information from the prediction tree comprises encoding child information for the respective nodes of the prediction tree.

6. The one or more non-transitory, computer-readable storage media of claim 1, wherein the respective prediction technique for determining one of the predicted node values is different than the respective prediction technique for determining another one of the predicted node values.

7. The one or more non-transitory, computer-readable storage media of claim 1, wherein the prediction techniques used to determine predicted node values for the respective nodes are selected from a group of supported prediction techniques, comprising:

not predicted, wherein a node value for a child node is coded without prediction;

a delta prediction technique, wherein a node value for a child node is predicted as a difference from a node value of a parent node;

a linear prediction technique, wherein a node value for a child node is predicted based on a relationship between a parent node and a grandparent node of the child node;

a parallelogram prediction technique, wherein a node value for a child node is determined based on a relationship between a parent node, a grandparent node, and a great grandparent node of the child node.

8. The one or more non-transitory, computer-readable storage media of claim 1, wherein, in the selecting the individual ones of the plurality of points to include in the plurality of nodes in the prediction tree, the program instructions cause the one or more computing devices to:

select the plurality of points according to space filling curve values determined for the plurality of points; and wherein, in the determining the respective predicted node values for the individual ones of the points determined from the respective prediction techniques applied to one or more ancestor nodes in the prediction tree, the program instructions cause the one or more computing devices to:

evaluate a k-d tree of possible ancestor nodes based on node values for nodes previously added to the prediction tree.

9. The one or more non-transitory, computer-readable storage media of claim 1, wherein, in the selecting the individual ones of the plurality of points to include in the respective ones of the plurality of nodes in the prediction tree, the program instructions cause the one or more computing devices to:

select the plurality of points according to an in order in which the plurality of points are received; and wherein, in the determining the respective predicted node values for the individual ones of the points determined from the respective prediction techniques applied to one or more ancestor nodes in the prediction tree, the program instructions cause the one or more computing devices to:

evaluate a buffer of at least some of the plurality of points as possible ancestor nodes based on node values for nodes included in the buffer.

10. One or more non-transitory, computer-readable storage media, storing program instructions that when executed on or across one or more computing devices cause the one or more computing devices to:

receive encoded node information for nodes corresponding to a plurality of points representing a three-dimensional (3D) scene, wherein one or more child nodes and one or more ancestor nodes of the one or more child nodes correspond to respective points of the 3D scene;

decode the encoded node information, wherein, in decoding the encoded node information, the program instructions cause the one or more computing devices to further:

decode respective indicated child nodes according to respective prediction techniques indicated in the node information, wherein values of at least one of the respective points of the respective child nodes were predicted according to the respective prediction techniques; and store or render the plurality of points of the 3D scene decoded from the node information.

11. The one or more non-transitory, computer-readable storage media of claim 10, wherein the encoded node information further comprises correction values for the predicted node values, wherein to decode the respective indicated child nodes the program instruction, when executed on or across the one or more computing devices, cause the one or more computing devices to further:

determine respective predicted node values for individual ones of the one or more child nodes based on respective prediction techniques included in the node information for the individual ones of the child nodes, wherein the prediction technique is applied to one or more ancestor nodes of the individual child node to predict the node value for the individual child node; and apply the correction values included in the node information for the respective nodes to determine reconstructed node values for the individual ones of the child nodes.

12. The one or more non-transitory, computer-readable storage media of claim 11, wherein the reconstructed node values for the individual ones of the child nodes comprise:

reconstructed spatial information for the individual ones of the child nodes; or reconstructed attribute values for the individual ones of the child nodes.

13. The one or more non-transitory, computer-readable storage media of claim 10, wherein the encoded node information additionally indicates ancestor node to child node relationships for individual ones of the one or more child nodes, wherein the prediction techniques included in the node information for the individual ones of the one or more child nodes indicate one or more ancestor nodes for the individual child node from whom node values are used as inputs in the prediction technique for the individual child node.

14. The one or more non-transitory, computer-readable storage media of claim 10, wherein the received encoded node information is for nodes of a first level of detail (LOD) for the 3D scene, wherein the program instructions, when executed by the one or more computing devices, further cause the one or more computing devices to:
  receive additional encoded node information for other nodes of a second level of detail for the 3D scene;
  decode the additional encoded node information, wherein, in decoding the additional encoded node information, the program instructions cause the one or more computing devices to further:
    decode respective indicated child nodes of the second level of detail according to prediction techniques included in the additional node information for the child nodes of the second level of detail; and
  store or render the plurality of points of the 3D scene, including points of the first level of detail (LOD) and points of the second level of detail (LOD).

15. The one or more non-transitory, computer-readable storage media of claim 14, wherein for at least some of the child nodes of the second level of detail, the prediction technique for the at least some child nodes predicts the node values for the child nodes of the second level of detail based on node values of ancestor nodes in the first level of detail.

16. The one or more non-transitory, computer-readable storage media of claim 10, wherein the encoded node information comprises node information for multiple frames in time, and
  wherein at least some of the prediction techniques included in the node information for the individual ones of the child nodes comprise prediction techniques that use ancestor nodes of the individual ones of the child nodes that are included in other ones of the frames in time to predict node values for the individual ones of the nodes in a different one of the frames in time.

17. A system, comprising:
  a memory storing program instructions, and
  one or more processors configured to execute the program instructions to:
    generate a prediction tree comprising a plurality of nodes that correspond to a plurality of points that represent a three-dimensional (3D) scene captured using one or more sensors, wherein respective ones of the points captured using the one or more sensors comprise spatial information for the respective points, and wherein, in generating the prediction tree, the program instructions cause the one or more computing devices to:
      select individual ones of the plurality of points to include in respective ones of the plurality of nodes in the prediction tree;
      determine respective predicted node values, for the individual ones of the points, determined using respective prediction techniques applied to one or more ancestor nodes of one or more nodes of the prediction tree representing the individual ones of the points, wherein the one or more ancestor nodes correspond to one or more other nodes in the prediction tree for which corresponding node values are known or have been predicted for one or more other points of the 3D scene;
    encode node information of the prediction tree, wherein the encoded node information comprises, for a given node, an indicator of the respective prediction technique applied to determine the respective predicted node value for the given node; and
    send or store the encoded node information.

18. The system of claim 17, further comprising:
  the one or more sensors, wherein the one or more sensors are LIDAR sensors.

19. The system of claim 17, wherein the program instructions, when executed by the one or more processors, further cause the one or more processors to:
  determine correction values for the predicted node values, wherein the correction values are determined based on:
    a spatial difference between a predicted spatial location for one of the individual ones of the points corresponding to the node and a spatial location for the individual point in the 3D scene; or
    an attribute value difference between a predicted attribute value for one of the individual ones of the points corresponding to the node and an attribute value for the individual point in the 3D scene,
  wherein encoding the node information from the prediction tree comprises encoding the determined correction values associated with the nodes of the prediction tree.

20. The system of claim 17 wherein the program instructions, when executed by the one or more processors, further cause the one or more processors to:
  perform a rate distortion optimization (RDO) analysis to select the respective prediction techniques to be used for predicting node values of the nodes of the prediction tree.

* * * * *